United States Patent [19]

Ogasawara

[11] Patent Number: 4,979,810
[45] Date of Patent: Dec. 25, 1990

[54] REAR VIEW MIRROR ASSEMBLY FOR MOTOR VEHICLE

[75] Inventor: Morihiko Ogasawara, Aichi, Japan

[73] Assignee: Kabushiki Kaisha Tokai Rita Denki Seisakusho, Aichi, Japan

[21] Appl. No.: 392,455

[22] Filed: Aug. 11, 1989

[30] Foreign Application Priority Data

Aug. 19, 1988 [JP] Japan .......................... 63-109375[U]

[51] Int. Cl.⁵ .......................... B60R 1/06; G02B 7/18; F16H 37/00
[52] U.S. Cl. .............................. 350/633; 74/424.8 R; 74/459; 74/89.15
[58] Field of Search ............... 350/634, 633, 632, 637; 74/424.8 R, 459, 89.15

[56] References Cited

U.S. PATENT DOCUMENTS 3,972,597 8/1976 Repay et al. .................... 350/634
4,041,793 8/1977 Repay et al. .................... 74/424.8 R Primary Examiner—Jon W. Henry

[57] ABSTRACT

A rear view mirror assembly for a motor vehicle, includes a mirror holder for supporting a mirror body, an operating threaded shaft movable backward and forward along an approximate axial direction thereof in a mirror case, and a nut member connected with a driving device in the case. The holder is supported to be inclinable around a lateral and/or a vertical incline center axes with respect to the case. The head of the shaft is fitted in the fitting portion of the holder to be inclinable relative to the fitting portion. The screwed portion of the shaft is screwed in the nut member. The nut member has an annular projecting portion for sliding on a circumferential surface of the shaft. The specified portion of the shaft, which is positioned at the opposite side to the holder and away from the screwed portion, is penetrated through a through hole formed by the projecting portion to be movable backward and forward along the approximate axial direction of the shaft and inclinable therearound. By driving of the device, the nut member is rotated either backward or forward to move the shaft along the approximate axial direction thereof relative to the case and then to incline the holder relative to the case.

8 Claims, 2 Drawing Sheets

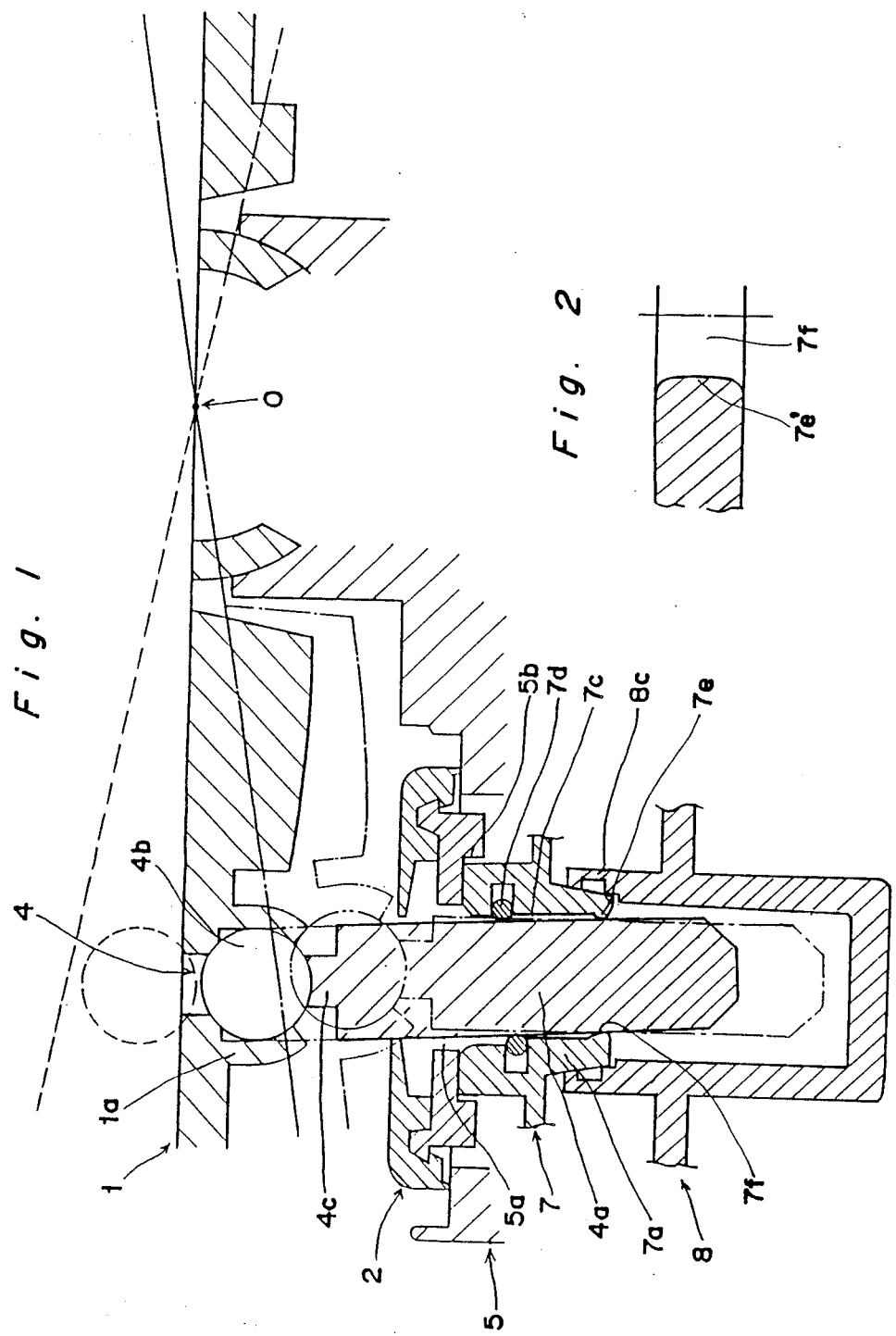

REAR VIEW MIRROR ASSEMBLY FOR MOTOR VEHICLE

BACKGROUND OF THE INVENTION

The present invention relates to a rear view mirror assembly particularly suitable for a motor vehicle, and more particularly, an assembly of so-called outer or external reflecting mirror such as a fender mirror, door mirror, etc. for a motor vehicle in which a mirror body of the mirror is inclined by backward and forward movement of an operating threaded shaft for angle adjustment of the body.

Conventionally, there have been proposed this kind of rear view mirror assemblies for motor vehicle which have various constructions, respectively. For example, the mirror assembly is constructed as follows. A mirror holder supporting a mirror body is supported to be capable of inclining to a mirror case around a lateral and/or a vertical incline center axes with respect to the mirror case. The head of the top end of an operating threaded shaft provided so as to move backward and forward along the axial direction thereof in the case is fitted in the fitting portion of the holder to be capable of being inclined, and the middle portion of the shaft is screwed in the end of the mirror holder side of a nut member operably connected with a driving device in the case. Then, the nut member is rotated by driving the driving device and then the shaft is moved backward and forward along the approximately axial direction thereof to the case, with the result that the holder is inclined to the case.

According to the construction, however, since the head of the shaft is supported by the holder, and the middle portion of the shaft is supported by the nut member, whereby the shaft is inclined to the holder around the middle portion thereof, where the shaft is screwed in the nut member, the incline center of the shaft is positioned in the vicinity of the holder. Therefore, the incline angle of the shaft intends to increase and then the shaft moves backward and forward along the axis of the shaft while rolling around the axis thereof As a result, it is difficult to smoothly incline the mirror body.

SUMMARY OF THE INVENTION

The object of the present invention is, therefore, to remedy the above-described problems and to provide a rear view mirror assembly for a motor vehicle in which a mirror body is smoothly inclined for angle adjustment of the body.

In accomplishing these and other objects, a rear view mirror assembly according to the present invention comprises: a mirror holder supporting a mirror body and supported by a mirror case to be capable of inclining around a lateral and/or a vertical incline center axes with respect to the case; an operating threaded shaft provided to be capable of moving backward and forward along an approximately axial direction thereof in the case, a head of the shaft being fitted in a fitting portion of the holder to be capable of inclining to the fitting portion; and a nut member operably connected with a driving device in the case, the shaft being screwed in the member, the member having an annular projecting portion for sliding on a circumferential surface of the shaft which is formed at an end of the opposite side to the holder, a specified portion of the shaft which is positioned at the opposite side to the holder and away from a screwed portion where the shaft is screwed in the member being penetrated through a through hole formed by the projecting portion thereof to be capable of moving backward and forward along the approximately axial direction of the shaft and inclining therearound, wherein by driving of the device, the member is rotated so as to backward and forward move the shaft along the approximately axial direction thereof to the case and then to incline the holder to the case.

According to the present invention, since the specified portion, positioned at the opposite side to the holder and away from the screwed portion where the shaft is screwed in or engaged with the nut member, of the shaft is supported by the annular projecting portion, and the shaft is inclined around the portion supported by the projecting portion and serving as a fulcrum, the incline angle of the shaft can be decreased as a whole and the inclining movement of the holder can be smoothly performed, as compared with the conventional mirror assembly in which an operating threaded shaft is supported by a portion where the shaft is screwed in a nut member.

That is, in the conventional mirror assembly, the shaft is supported by a mirror holder and the portion where the shaft is screwed in the nut member, the incline center of the shaft is the portion where the shaft is screwed in the nut member, when the shaft is inclined to the holder, and the portion is located near the head of the shaft, that is, the holder. Therefore, it causes the incline angle of the shaft to intend to increase as a whole, and it is difficult to smoothly perform the inclining movement of the holder.

On the other hand, in the present invention, the shaft is supported by the projecting portion, of the nut member, positioned on the opposite side to the holder, and the incline center of the shaft is the support portion where is supported by the projecting portion, that is, is positioned on the opposite side to the holder and away from the screwed portion where the shaft is screwed in the nut member, when the shaft is inclined to the holder. Therefore, the incline angle of the shaft can be decreased as a whole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with preferred embodiments thereof with reference to the accompanying drawings, which are given by way of illustration only, and thus are not limitative of the present invention, and throughout which like parts are designated by like reference numerals, and in which:

FIGS. 1-3 show the one embodiment of the present invention,

FIG. 1 is a partially enlarged cross sectional view of the rear view mirror assembly according to the embodiment;

FIG. 2 is an enlarged view showing a hole inner surface configuration of a second through hole shown in Fig. 1; and FIG. 3 is a perspective view of an operating thread shaft.

DETAILED DESCRIPTION OF THE PREFERRED EMBODIMENTS

Figure 3:
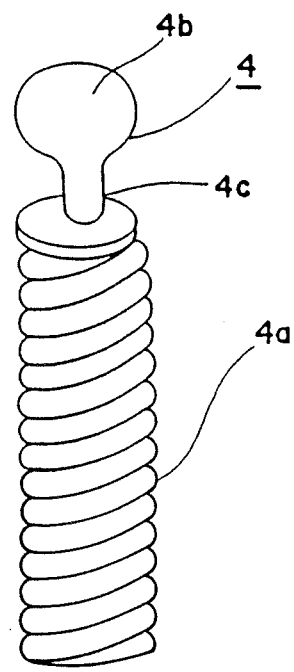

FIG. 1 shows a rear view mirror assembly particularly suitable for a motor vehicle, according to the one embodiment of the present invention. In FIG. 1, a mirror holder 1 supporting a mirror body, (not shown) is supported by a mirror case (not shown) to be capable of inclining around a lateral incline center axial direction and/or a vertical incline center axial direction with respect to the case respectively. A head 4b of an operating threaded shaft 4 for pushing or pulling the mirror holder 1 is fitted in a fitting portion 1a of the rear face of the holder 1 to be capable of inclining along the axial direction thereof. A screwed portion near the head 4b of the shaft 4 is screwed in or with a nut member 7 operably connected with a driving device in the case. Therefore, the shaft 4 moves backward and forward along the approximately axial direction thereof by driving of the driving device through the nut member 7, so that the holder 1 is inclined to the case so as to adjust the incline angle of the mirror body.

The fitting portion 1a of the rear face of the holder 1 is formed as a recess with a spherical inner surface, and the holder 1 is capable of inclining around the lateral and/or vertical incline center axes through the rotary center O thereof.

As shown in FIG. 3, the shaft 4 has a small-out-side diameter neck portion 4c and the ball-shaped head 4b which are integrally and axially formed at the top end of the leg portion 4a thereof in series. The head 4b is supported to be fitted therein so as to be capable of rotating by the fitting portion 1a of the holder 1. The leg portion 4a thereof has an external thread portion on the circumferential surface thereof.

In the case supporting the holder 1 to be capable of inclining it, a lower casing 5 and an upper casing 8 fitting to the lower casing 5 and serving as a supporting member are provided. In both the casings 5 and 8, members such as the driving device for driving the shaft 4 are accommodated.

On the lower casing 5, a through hole 5a with larger inside diameter than the outside diameter of the leg portion 4a of the shaft 4 is formed, so that the leg portion 4a of the shaft 4 is penetrated through the hole 5a to be capable of moving approximately axially and relatively inclining.

The driving device is provided with a driving motor (not shown) and the nut member 7 operably connected with the driving motor and fitted on the outer surface of the shaft 4. The nut member 7 has a projecting wall 7a circumferentially formed projecting from the upper casing 8, and the wall 7a thereof is rotatably fitted inside a supporting wall 8c of the upper casing 8 to be positioned. The upper surface of the nut member 7 is relatively rotatably fitted in a recess 5b positioned on the upper casing side of the lower casing 5. Then, the nut member 7 is rotated guiding between the casings 5 and 8. A spring arm 7d is fitted on the middle inner surface of an axial first through hole 7c of the middle of the nut member 7, so that the arm 7d is capable of rotating together with the nut member 7. The arm 7d is engaged with the external thread portion on the outer circumferential surface of the leg portion 4a of the shaft 4 to prevent the shaft 4 from freely moving in the axial direction of the shaft 4 to the nut member 7. Therefore, when the nut member 7 rotates normally and reversibly between the casings 5 and 8, since the nut member 7 can not move in the axial direction of the shaft 4 to the case, the shaft 4 engaged with the arm 7d moves backward and forward in the approximately axial direction thereof. The first through hole 7c has such a larger inside diameter than the outside diameter of the shaft 4 so that the shaft 4 is capable of inclining relative thereto, and such figuration that the arm 7d fitted in the nut member 7 can be biased in the first through hole 7c.

On the other hand, an annular projecting portion 7e sliding on the outer circumferential surface of the shaft 4 is formed on the opposite side, to the mirror holder, of the first through hole 7c of the nut member 7. By the projecting portion 7e, a second through hole 7f is formed. Therefore, the leg portion 4a of the shaft 4 is penetrated L- through the second through hole 7f to be capable of inclining and approximately axially moving. Then, the second through hole 7f has the approximately same inside diameter as the outside diameter of the leg portion 4a of the shaft 4, and such an approximately arc cross-sectional inner surface 7'e, serving as an inner surface of the projecting portion 7e, that the shaft 4 is capable of inclining to the second through hole 7f as shown in FIG. 2.

In FIG. 1, reference numeral 2 denotes a rubber simplified water-proof sealing member for preventing water from penetrating in the casings 5 and 8 through the shaft 4.

According to the construction of the embodiment, the mirror assembly in which the holder 1 is assembled into the case is operated as follows. When the driving motor is driven, the nut member 7 is rotated so as to move the leg portion 4a of the shaft 4 backward and forward in the approximately axial direction thereof. At that time, when the holder 1 is pushed by the shaft 4, the head 4b of the shaft 4 pushes the fitting portion 1a of the holder 1 so as to incline the holder 1 to the case around the lateral incline center axial direction and/or the vertical incline center axis. When the holder 1 is pulled by the shaft 4, the head 4b of the shaft 4 pulls the fitting portion 1a of the holder 1 toward the casings 5 and 8 so as to incline the holder 1 to the case around the lateral incline center axial direction and/or the vertical incline center axis.

Since the shaft 4 is assembled into the case to be capable of inclining and approximately axially moving, the head 4b of the shaft 4 is inclined to the holder 1 as well as the casings 5 and 8 in the fitting portion 1a thereof in inclining the holder 1. The inclining movement of the shaft 4 is regulated by the second through hole 7f formed by the annular projecting portion 7e of the nut member 7. That is, the shaft 4 is inclined around the support portion supported by the projecting portion 7e and serving as a fulcrum in the second through hole 7f. A support portion, positioned on the opposite side to the holder 1, of the shaft 4 is hardly displaced in the direction perpendicularly intersecting to the axial direction of the shaft 4 on the basis of the incline of the shaft 4. Here, the end, positioned on the opposite side to the holder 1, of the shaft 4 has a sufficient axial length not to fall from the second through hole 7f. Some of the incline of the shaft 4 in the first through hole 7c of the nut member 7 can be absorbed by bias movement of the arm 7d.

According to the embodiment, the support portion of the shaft 4 which is positioned away from the screwed portion screwed in the nut member 7 of the shaft 4 and on the opposite side to the holder 1, is supported by the annular projecting portion 7e formed the second through hole 7f of the nut member 7, and the shaft 4 is inclined around the support portion of the shaft 4, which is supported by the portion 7e which served as a fulcrum. Therefore, the incline angle of the shaft 4 can be decreased as a whole, resulting in smooth inclining movement of the mirror body, as compared with the conventional mirror assembly in which an operating threaded shaft is supported by a portion screwed in a nut member.

That is, in the conventional mirror assembly, the shaft is supported by the nut member and a mirror holder, and when the shaft is inclined to the holder, the incline center of the shaft is the support portion supported by the nut member. Therefore, the incline angle of the shaft intends to increase as a whole, thereby preventing a smooth inclining movement of the mirror body. As compared with this assembly, in the embodiment, the shaft 4 is supported by the nut member 7, the holder 1, and the upper casing 8, and when the shaft 4 is inclined relative to the holder 1, the incline center thereof is the support portion supported by the projecting portion 7e of the nut member 7, that is, the support portion is positioned away from the screwed portion screwed in the nut member 7 and on the opposite side to the holder 1. Therefore, the incline angle thereof can be decreased as a whole.

Furthermore, in the embodiment, it is possible that the support portion of the shaft 4 positioned on the opposite side to the holder 1, is supported by the upper casing 8, and the incline center of the shaft 4 is dislocated to the support portion supported by the upper casing 8 so as to decrease the incline angle of the shaft 4. In such a mirror assembly, however, it is required for the shaft 4 to sufficiently elongate the shaft length to the upper casing 8 for supporting the shaft 4, resulting in elongation of the shaft 4. On the other hand, since in the embodiment, the shaft 4 is supported by the projecting portion 7e of the nut member 7, such a disadvantage can be avoided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A rear view mirror assembly comprising:
   a mirror holder supporting a mirror body and supported by a mirror case, the mirror holder being inclinable around one of a lateral and vertical incline center axes with respect to the case;
   an operating threaded shaft provided movable backward and forward along an approximate axial direction thereof in the case, a head of said shaft being fitted in a fitting portion of said holder to be inclinable relative to the fitting portion; and
   a nut member operably connected with a driving device in the case, said shaft being screwed in said member, said member having an annular projecting portion for sliding on and guiding a circumferential surface of said shaft which is formed at an end of the opposite side to said holder; said annular projecting portion connecting a relatively small portion of the shaft and being a fulcrum for the shaft, a specified portion of said shaft which is positionable at the opposite side to said holder and away from a screwed portion where said shaft is screwed in said member being penetrated through a hole formed by the projecting portion thereof to be movable backward and forward along the approximate axial direction of said shaft and inclinable therearound,
   wherein by driving the device, said member is rotated to move the shaft backward and forward along the approximate axial direction thereof to the base and then to incline said holder to the case.

2. The rear view mirror assembly as claimed in claim 1, wherein an inner surface of the through hole has an arc cross-sectional configuration to facilitate inclining of the shaft.

3. The rear view mirror assembly as claimed in claim 1, wherein said member has a spring arm attached with the circumferential surface of said shaft so that said shaft is screwed in said member.

4. The rear view mirror assembly as claimed in claim 2, wherein said member has a spring arm engaged with the circumferential surface of said shaft so that said shaft is screwed in said member.

5. The rear view mirror assembly as claimed in claim 1, wherein the head of said shaft is formed as a ball portion and the fitting portion of said holder has a spherical inner surface for supporting the ball-shaped head of said shaft to be inclinable relative to the fitting portion thereof.

6. The rear view mirror assembly as claimed in claim 3, wherein the spring arm is movable relative to the member, said spring arm being located between the annular projecting portion of the member and the fitting portion of the holder.

7. The rear view mirror assembly as claimed in claim 4, wherein the spring arm is movable relative to the member, said spring arm being located between the annular projecting portion of the member and the fitting portion of the holder.

8. The rear view mirror assembly as claimed in claim 1, wherein the member has a spring arm engaging a circumferential surface of the shaft, the shaft engaging the member at two locations, the first location being at the spring arm and the second location being at the annular portion.

* * * * *